US012766908B2

(12) United States Patent
Shrivastava et al.

(10) Patent No.: US 12,766,908 B2
(45) Date of Patent: Oct. 20, 2026

(54) ELECTRIFIED VEHICLE WITH BIASED CONTROL OF HEATING SOURCES

(71) Applicant: Ford Global Technologies, LLC, Dearborn, MI (US)

(72) Inventors: Rohan Shrivastava, Livonia, MI (US); Jordan Mazaira, Taylor, MI (US); Westin Pusey, Brownstown, MI (US); Scott Vehige, Woodhaven, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 328 days.

(21) Appl. No.: 18/105,571

(22) Filed: Feb. 3, 2023

(65) Prior Publication Data

US 2024/0262157 A1 Aug. 8, 2024

(51) Int. Cl.
*B60H 1/00* (2006.01)

(52) U.S. Cl.
CPC ......... *B60H 1/00278* (2013.01); *B60H 1/004* (2013.01); *B60H 1/00771* (2013.01); *B60H 2001/00307* (2013.01)

(58) Field of Classification Search
CPC B60H 1/00278; B60H 1/004; B60H 1/00771; B60H 2001/00307; B60H 1/143
USPC ........................................................ 62/238.7
See application file for complete search history.

(56) References Cited

U.S. PATENT DOCUMENTS 9,315,190 B2 * 4/2016 Yu ........................ B60W 10/06
9,389,007 B1 * 7/2016 McKay ................ F25B 47/025
9,819,063 B2 * 11/2017 Blatchley ............ H01M 10/663
9,834,063 B2 12/2017 Kang et al.
9,914,368 B1 * 3/2018 Marcicki ................ B60L 58/25
9,950,638 B2 * 4/2018 Porras ................ B60H 1/00921
(Continued)

FOREIGN PATENT DOCUMENTS

CN 107031603 B 8/2017
CN 110168829 A * 8/2019 ............. H02J 3/003
(Continued)

OTHER PUBLICATIONS

CN 110168829 A machine translation (Year: 2024).*
CN 1101251832 A machine translation (Year: 2024).*
WO 2020153032 A1, machine translation (Year: 2024).*

*Primary Examiner* — Eric S Ruppert
*Assistant Examiner* — Kirstin U Oswald
(74) *Attorney, Agent, or Firm* — David B. Kelley; Brooks Kushman P.C.

(57) ABSTRACT

An electrified vehicle includes an electric machine powered by a battery to provide torque to vehicle wheels, a heater powered by the battery, a cooling circuit that circulates cooling fluid through the electric machine, the battery, the heater, and a heat exchanger, a heat pump in fluid communication with the heat exchanger, and a controller programmed to, responsive to a heating request without a stored heating source preference: when external electric power is available and state of charge (SOC) of the battery is above an associated threshold, operate the heater to heat the cooling fluid; and operate the heat pump to heat the cooling fluid otherwise. The heating source preference may be input via a human-machine interface and may bias the heating source selection for quiet operation using the electric heater as a preferred primary heating source or more efficient operation using the heat pump as the preferred primary source.

19 Claims, 3 Drawing Sheets

(56) References Cited

U.S. PATENT DOCUMENTS 9,987,944 B2 6/2018 Dunlap et al.
10,232,844 B2 * 3/2019 Hirabayashi ........... B60K 6/445
10,336,158 B2 * 7/2019 Ragazzi ............... B60H 1/2221
10,392,018 B1 * 8/2019 Rhodes .................. B60L 58/25
10,457,111 B2 10/2019 Gebbie et al.
10,611,213 B2 4/2020 Suzuki et al.
10,866,019 B2 12/2020 Blatchley et al.
10,882,411 B2 * 1/2021 Yang ...................... B60L 53/14
10,900,499 B2 1/2021 Martin et al.
10,967,702 B2 4/2021 Mancini et al.
11,161,428 B2 * 11/2021 Wang ..................... B60L 53/62
11,208,976 B2 * 12/2021 Chen .................. F02N 11/0825
2001/0039230 A1 * 11/2001 Severinsky ............ F02B 37/18 180/65.23
2006/0260335 A1 * 11/2006 Montuoro ............... F25D 29/00 62/236
2008/0180058 A1 * 7/2008 Patel ...................... B60L 1/003 320/109
2008/0275600 A1 * 11/2008 Rask ...................... B60L 58/27 701/22
2009/0145141 A1 * 6/2009 Akahoshi ............... B60H 1/004 62/133
2010/0089669 A1 * 4/2010 Taguchi .................. B60L 58/15 180/65.1
2011/0006741 A1 * 1/2011 Ando ................. H01M 10/488 52/173.1
2011/0031937 A1 * 2/2011 Bito ........................ B60L 58/12 320/150
2011/0307134 A1 * 12/2011 Yoshimi ................ B60W 20/00 903/905
2012/0225341 A1 * 9/2012 Major ..................... B60L 3/003 429/120
2013/0020046 A1 * 1/2013 Momose ............ B60H 1/00428 165/11.1
2013/0139528 A1 * 6/2013 Katayama .......... B60H 1/00921 62/81
2013/0173102 A1 * 7/2013 Aldighieri ............... B60L 50/60 903/903
2013/0211649 A1 * 8/2013 Tashiro .................. B60H 1/004 701/22
2013/0269911 A1 * 10/2013 Carpenter .............. B60H 1/004 165/104.19
2013/0270249 A1 * 10/2013 Suzuki ................ H01M 10/625 219/202
2014/0070013 A1 * 3/2014 Stanek .................... B60L 1/003 237/28
2014/0070606 A1 * 3/2014 Gibeau .................. B60K 35/10 307/9.1
2014/0096550 A1 * 4/2014 Gao ........................ B60L 58/21 62/126
2014/0114514 A1 * 4/2014 Crombez .............. B60W 20/13 903/930
2015/0260442 A1 * 9/2015 Ragazzi ................. B60H 1/321 62/151
2015/0336568 A1 * 11/2015 Porras ................... B60W 10/06 180/65.265
2016/0320107 A1 * 11/2016 McKay ................ H02K 7/1846
2016/0332504 A1 * 11/2016 Blatchley ................ F25B 49/02
2016/0361974 A1 * 12/2016 Porras .................. B60H 1/2221
2017/0008407 A1 * 1/2017 Porras ..................... B60L 58/26
2019/0070924 A1 * 3/2019 Mancini ............. B60H 1/32281
2021/0061122 A1 * 3/2021 Otsuki ...................... B60S 5/00
2021/0188043 A1 * 6/2021 Smith .................. B60H 1/3204
2021/0260959 A1 * 8/2021 Nakahara ........... B60H 1/00764
2022/0105793 A1 * 4/2022 Sukhatankar .......... B60K 25/06

FOREIGN PATENT DOCUMENTS

CN 111251832 A * 6/2020 ......... B60H 1/00278
WO WO-2020153032 A1 * 7/2020 ............ H01M 10/48

* cited by examiner

ELECTRIFIED VEHICLE WITH BIASED CONTROL OF HEATING SOURCES

TECHNICAL FIELD

This application is related to control of electrified vehicle heating sources such as a heat pump and electric heater to provide thermal management considering associated heat source operational characteristics such as NVH and efficiency.

BACKGROUND

Electrified vehicles, including electric vehicles and hybrid electric vehicles, have multiple sources to provide heat for various thermal needs. Thermal needs may include cabin comfort as well as maintaining the batteries, power electronics, and various other components within desired temperature ranges for peak performance during travel, in addition to operations that may be performed while the vehicle is keyed off, such as charging or preconditioning the vehicle so it is thermally conditioned and ready for the next scheduled or planned usage.

The different sources of heating may involve operation of multiple devices in the system. For example, on a heat pump system, the AC refrigerant compressor may operate along with one or more electric fans and coolant pumps to heat the coolant, whereas a High Voltage (HV) heater system may directly heat the coolant using a resistive element powered by the battery. Because the heat pump requires operation of rotating components, it induces noise, vibration, and harshness (NVH) in the system. While operation of the HV heater may be quieter, an HV heater may have a lower coefficient of performance resulting in lower efficiency than the heat pump system.

Electrified vehicles equipped with a heat pump system may be designed with NVH in mind, but are typically operated to maximize efficiency without regard to the increased NVH. This may result in objectionable noise in some situations, such as overnight battery charging inside a residential garage, or early/late travel through a residential quiet zone, for example.

SUMMARY

In various embodiments, an electrified vehicle includes an electric machine arranged to selectively provide propulsive torque to wheels of the electrified vehicle, a battery electrically coupled to the electric machine, a heater powered by the battery and configured to heat a cooling fluid, a cooling circuit arranged to circulate the cooling fluid through the electric machine, the battery, the heater, and a heat exchanger, a heat pump in fluid communication with the heat exchanger, and a controller programmed to, in response to a heating request without a stored heating source user preference: when external electric power is available and state of charge (SOC) of the battery is above an associated SOC threshold, operate the heater to heat the cooling fluid; and operate the heat pump to heat the cooling fluid otherwise. The controller may be further programmed to, responsive to the heating request and a stored heating source user preference corresponding to quiet operation: operate the heater to heat the cooling fluid when the SOC of the battery is above a corresponding threshold; and operate the heat pump to heat the cooling fluid when the SOC of the battery is not above the corresponding threshold. The controller may be further programmed to operate the heat pump to heat the cooling fluid in response to the available external electric power being less than an associated power threshold. The controller may be further programmed to, responsive to the heating request and a stored heating source preference corresponding to efficient operation, operate the heat pump to heat the cooling fluid. The controller may be further programmed to, responsive to the heating request, a stored heating source preference, and operating conditions of the electrified vehicle being within a predetermined special zone of operation, operate the heater to heat the cooling fluid. The predetermined special zone of operation may correspond to operation within a geofenced region. The predetermined special zone of operation may correspond to operation within a predetermined range of ambient temperatures. The predetermined special zone of operation may correspond to operation below a predetermined vehicle speed.

In various embodiments, the electrified vehicle includes a human-machine interface (HMI) with the controller programmed to store a heating source user preference received via the HMI. The user preference may be associate with a driving mode, such as eco mode or sport mode, for example. Alternatively, or in combination, the user preference may be designated as a quiet mode or efficient mode independent of a selected driving mode, for example. A default mode may be specified based on the type or trim level of the electrified vehicle. For example, a luxury vehicle or luxury trim level may default to a quiet mode with the heat source selection biased toward use of the electric heater (although the heat pump may be operated as the primary heating source or in combination with the electric heater under certain operating conditions) whereas a compact vehicle or base trim level may default to an efficient mode biased toward use of the heat pump. The controller may be further programmed to bias operation of the heater and/or the heat pump in response to the heating request, the stored heating source user preference, and current operating conditions of the electrified vehicle.

In one or more embodiments, a method for controlling an electrified vehicle having a battery powering an electric machine to provide torque to vehicle wheels, an electric heater powered by the battery, and a heat pump, includes, by a vehicle controller: responsive to a heating request without a stored heating source user preference, operating the heater to heat a cooling fluid if external power is available and state of charge (SOC) of the battery is above an associated SOC threshold, and operating the heat pump to heat the cooling fluid otherwise. In various embodiments, the electrified vehicle includes a human-machine interface (HMI) and the method further includes receiving a user preference associated with a preferred heating source via the HMI, and selecting at least one of the heater and the heat pump for operation to provide heat in response to the heating request based on the user preference. The method may also include selecting at least one of the heater and the heat pump for operation based on operation of the electrified vehicle being within a predetermined special zone of operation. The predetermined special zone of operation may include an ambient temperature range or a geographical region designated as a quiet zone.

Embodiments may also include a system having a cooling circuit including at least an electric heater and a heat pump configured to generate heat to a coolant circulating within the cooling circuit and a controller programmed to, in response to a heating request, operate at least one of the electric heater and the heat pump based on a previously stored preference associated with quiet operation or efficient operation of the system. The controller may be further programmed to operate the electric heater before operating the heat pump responsive to the stored preference indicating quiet operation of the system. The controller may be further programmed to operate the heat pump before operating the electric heater responsive to the stored preference indicating efficient operation of the system. The controller may be further programmed to operate the electric heater before operating the heat pump in response to the system being within a predetermined special zone of operation regardless of the previously stored preference. The predetermined special zone of operation may be a designated geographical quiet zone.

Control of electrified vehicle heating sources according to the disclosure may provide one or more advantages. For example, various configurations of the controller strategy allow a user to select a heating mode preference to prioritize quiet operation or efficient operation, and may allow the user to further identify one or more parameters associated with each mode preference, such as day/time, vehicle location, planned/scheduled vehicle usage, target charge completion time, battery SOC, etc. The control strategy provides greater customized control for key off scenarios and for operation in special zones, the ability to provide a different default mode and operating characteristics based on the type of vehicle and/or primary customer use being biased toward efficiency or quiet operation. In addition, the control strategy provides the ability to automatically select the heating mode based on other user selectable drive modes such as ‘ECO’ and ‘Quiet Flight’ mode during vehicle usage.

DETAILED DESCRIPTION

Figure 1:
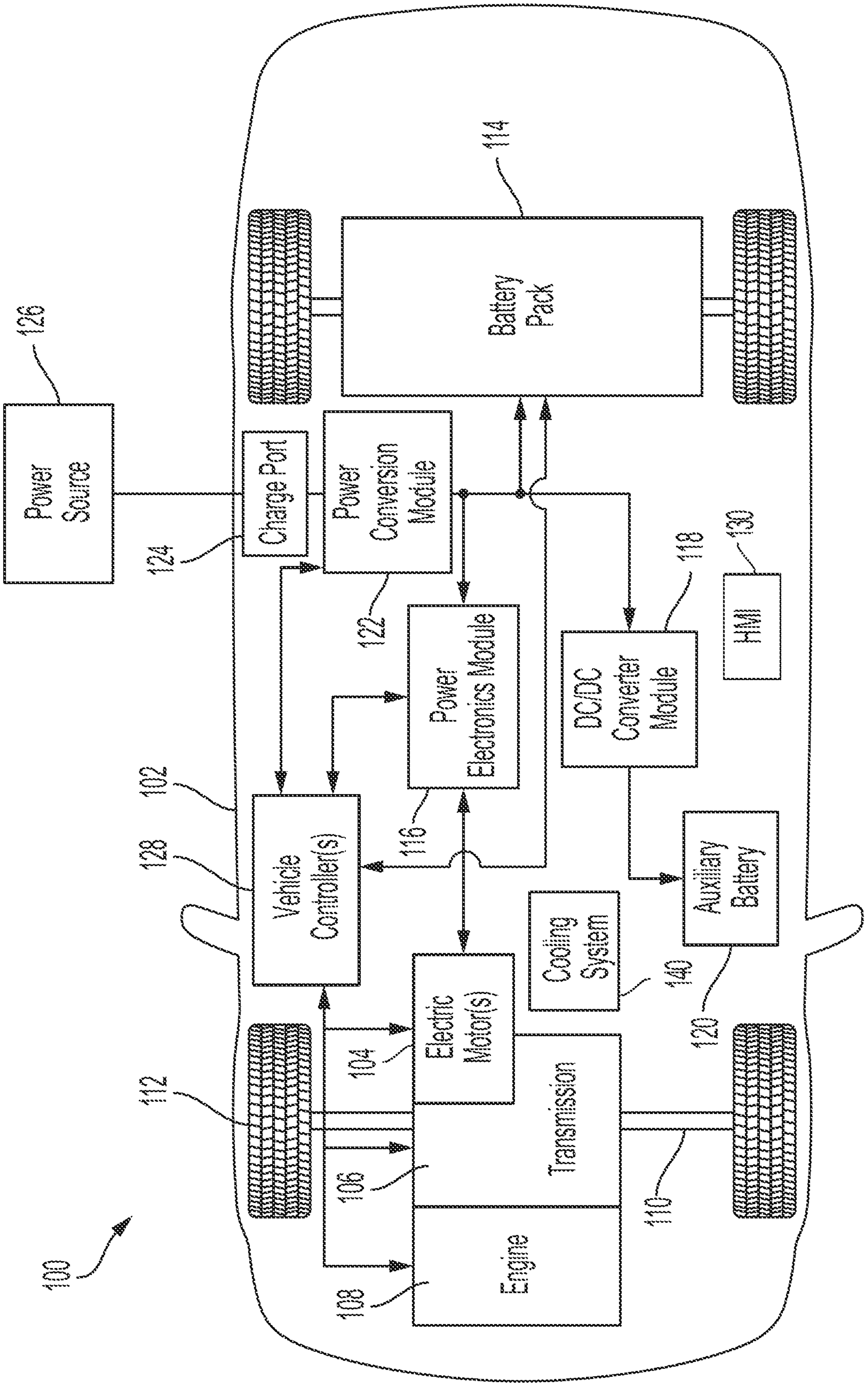
FIG. 1 is a block diagram illustrating a representative electrified vehicle including an electric heater and heat pump according to one or more embodiments.

As required, detailed representative examples of the claimed subject matter are disclosed herein; however, it is to be understood that the disclosed examples are merely representative and may be implemented in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

The present inventors have recognized that the ability to bias control of heating sources used in electrified vehicles having an electric heater and a heat pump system may better meet customer expectations in balancing tradeoffs between efficiency and NVH in various use scenarios. As described in greater detail herein, an electrified vehicle according to the disclosure may provide the ability for the user to select a Quiet Mode or Efficient mode for heating under certain specified conditions, such as during key off operation for charging and preconditioning and special/quiet zone operation, for example. A Special Zone can be defined based on ambient temperature, hours of operation, vehicle speed, geofencing etc. The manufacturer may select a different default heating mode based on the trim level of the vehicle. For example, for a lower trim level vehicle model, efficiency may be more important to users so that the default mode would be for best efficiency whereas on a higher trim level or luxury vehicle, the quiet heating mode may be more important to users and specified as the default operating mode. The vehicle controller may operate the electric heater and/or heat pump based on the default bias or a user-specified bias or preference to satisfy a heating request to heat a vehicle component such as the battery or passenger cabin. Additionally, the controller can also monitor the drive mode settings of the vehicle and control selection of a primary heating source accordingly to complement certain drive modes such as ECO/efficient or Neighborhood/quiet modes to complement the customer selection based on vehicle driving patterns and/or usage.

Various ambient and operating conditions may be considered by the controller in controlling one or more heating sources to meet a current or anticipated heating demand. For example, the control strategy may determine the location of the vehicle and vehicle plug status to determine if external power or energy is available from the grid for thermal management while also satisfying battery charge completion goals, such as a planned or scheduled departure or end of charge based on electric utility rates, for example. If the vehicle is not on-plug, then it may deplete the energy stored in the battery and therefore the efficient mode may be desired or preferred. If the vehicle is on-plug, then the charging power and battery state of charge (SOC) may be considered. If the vehicle charging is slow or the battery energy (SOC) is low, then the controller may operate in the efficient mode bias even if the user has selected a quiet mode bias. If the charging power and battery SOC are sufficient, then the heating system can be biased toward optimizing the quiet mode of operation. If the quiet mode is not available due to a fault, then the controller may activate the efficient mode and the heating system would be biased towards optimizing the efficiency using primarily the heat pump.

Based on a default setting and/or user selection in addition to the operating conditions, the controller may control heat sources while in the efficient mode to use only the heat pump, only the electric heater, or a combination of both. The vehicle controller responds to the user preference settings (or default mode) bias for the current operating conditions to control selection and operation of the heating source(s) in the best manner to provide requested heat to the system. Similarly, the quiet mode may prioritize operation of the electric heater, but may operate the heat pump system alone or in combination with the electric heater under certain environmental and operational conditions.

FIG. 1 depicts an example of an electrified vehicle 100, which is implemented as a plug-in hybrid-electric vehicle. The electrified vehicle 100 may comprise one or more three-phase electric machines 104 connected to a transmission 106. The electric machine(s) 104 may be controlled to provide torque to vehicle wheels. Transmission 106 is mechanically connected to an internal combustion engine 108 for hybrid implementations. Engine 108 may be configured to provide propulsive torque to vehicle wheels 112, or alternatively configured to operate one or more generators that deliver electric power to electric machines 104. The transmission 106 may also be mechanically connected to a drive shaft 110 that is mechanically connected to the wheels 112. The electric machines or motor/generators 104 can provide propulsion whether the engine 108 is turned on or off. The electric machines 104 may operate as motors, generators, or both and can extend the range of the vehicle by recovering energy during regenerative braking. Electrified vehicle 100 may also be implemented as a battery electric vehicle without an engine 108 and powered solely by traction battery 114.

Traction battery or battery pack 114 stores energy that can be used by the electric machines 104. A vehicle battery pack 114 typically provides a high voltage (HV) DC output provided by connecting hundreds of low voltage cells together. The battery pack 114 is electrically connected to a power electronics module 116. The power electronics module 116 is also electrically connected to the electric machines 104 and provides the ability to bi-directionally transfer energy between the battery pack 114 and the electric machines 104. For example, a typical battery pack 114 may provide a DC voltage/current while the electric machines 104 may require a three-phase AC voltage/current. The power electronics module 116 converts the DC voltage to a three-phase AC current as required for the electric machine 104 and may also be referred to as an inverter in various applications. Power electronics module 116 may also include a voltage converter that increases the DC voltage from the battery pack 114 supplied to the HV DC bus that powers the inverter. In a regenerative mode, the power electronics module 116 will convert the three-phase AC current from the electric machines 104 acting as generators to the DC voltage required to recapture energy in the battery pack 114.

In addition to providing energy for propulsion, the battery pack 114 may provide energy for other vehicle electrical systems. A typical system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a typical vehicle, the low voltage systems are electrically connected to a 12V, 24V, or 48V battery 120.

The battery pack 114 may be recharged by an external power source 126. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122, sometimes referred to as a charger or charging module. The power conversion module may condition the power from the external power source 126 to provide the proper voltage and current levels to the battery pack 114. In some applications, the external power source 126 may be configured to provide the proper voltage and current levels to the battery pack 114 and the power conversion module 122 may not be necessary. The functions of the power conversion module 122 may reside in the external power source 126 in some applications. The vehicle engine, transmission, electric machines, battery, power conversion, power electronics, and various other control modules, components, or systems may be controlled by a powertrain control module (PCM) 128. Alternatively, or in combination, various systems or subsystems may include associated control modules or controllers in communication with PCM 128 over a vehicle wired or wireless network to provide coordinated control of the vehicle. As used in this disclosure, a controller generally refers to one or more control modules or controllers that may cooperate to perform a particular task or function and is not limited to a single controller or any particular dedicated controller or control module.

Controller 128 receives input from a human-machine interface (HMI) 130 and stores associated user preferences in a non-transitory computer readable storage medium or memory (not shown). User preferences may include a driving mode, such as ECO, SPORT, NORMAL, etc. User preferences may also include a heating source preference or a vehicle operating mode that affects heating source selection and operation. In one embodiment, user preferences may include selection of either a quiet mode or an efficient mode that may be used in biasing selection and control of a heating source activated in response to a heating request as described in greater detail herein. Various embodiments according to the disclosure operate an electric heater before operating a heat pump in response to a heating request when a stored user preference indicates a bias for quiet operation, whereas a stored user preference indicating a preference for most efficient operation may operate the heat pump before operating the electric heater. The vehicle controller 128 controls the vehicle cooling system 140 by determining which of the available heating sources to operate based on the user preference, which may be indicated by a selected driving mode or a preference for quiet or most efficient operation, in addition to current ambient and operating conditions, such as battery temperature, battery SOC, distance to empty (DTE), passenger cabin heating request, cooling fluid temperature, ambient temperature, vehicle location, vehicle plug status, etc. In one embodiment, controller 128 is programmed to, in response to a heating request without a stored heating source user preference, when external electric power via power source 126 is available and state of charge (SOC) of the battery 114 is above an associated SOC threshold, operate an electric heater of the cooling system 140 to heat an associated cooling fluid, and operate a heat pump of the cooling system 140 to heat the cooling fluid otherwise.

The traction battery 114, the passenger cabin, and other vehicle components are thermally managed with one or more thermal management systems, generally referred to as a heating/cooling system or simply cooling system herein.

Figure 2:
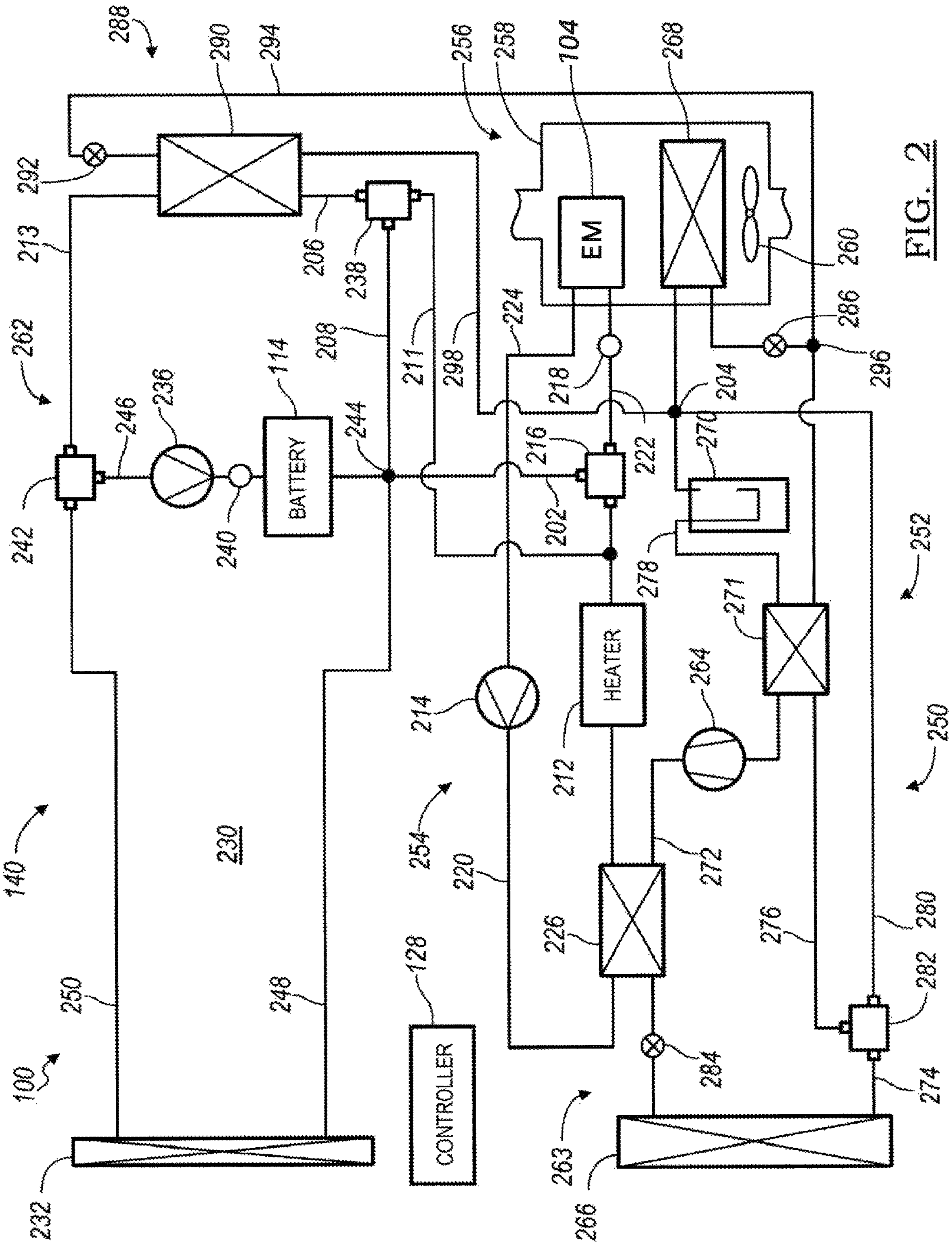
FIG. 2 is a diagram illustrating a representative cooling system including an electric heater and heat pump operable according to a default or user-specified heat source preference.

FIG. 2 illustrates a representative thermal management or cooling system for an electrified vehicle 100. Electrified vehicle 100 includes a cabin and an engine compartment that are separated by a bulkhead. Portions of the various thermal management or cooling systems may be located within various areas of the vehicle, such as the engine compartment and the cabin. The vehicle 100 includes a climate control system 250 having a heat-pump subsystem 252, a cabin-heating subsystem or cabin loop 254, and a ventilation subsystem 256.

The ventilation subsystem 256 may be disposed within the dashboard of the cabin. The ventilation subsystem 256 includes an HVAC housing 258 having an air-inlet side and air-outlet side. The outlet side is connected to ducts that distribute exiting air into the cabin. A blower motor drives a fan (or cabin blower) 260 for circulating air in the ventilation subsystem 256. The vehicle 100 may also include a battery thermal-management system 262 for managing the temperature of the traction battery 114. The battery thermal management system 262 and the climate control system 250 may be connected in fluid communication to form a single thermal circuit. In some embodiments, the battery thermal management system 262 and the climate control system 250 are selectively connected in fluid communication to form a single thermal circuit during certain operating conditions, and are separate thermal circuits during other operating conditions.

The heat pump 252 provides air conditioning of the cabin during some operating modes and is a heat source for the cabin heating subsystem 254 and battery 114 during other operating modes. The heat pump 252 also cools the battery 114 during some operating modes and heats the battery 114 during other operating modes. The heat pump subsystem 252 may be a vapor-compression heat pump that circulates a refrigerant transferring thermal energy to various components of the climate control system 250. The heat pump 252 may include a cabin loop 263 having a compressor 264, an exterior heat exchanger 266 (e.g. condenser), an interior heat exchanger 268 (e.g. evaporator), an accumulator 270, fittings, valves and expansion devices. The condenser 266 may be located behind the grille near the front of the vehicle 100, and the evaporator 268 may be disposed within the housing 258. It is to be understood that heat exchangers labeled as "condenser" may also act as an evaporator in some modes.

The cabin loop 254 components are connected in a closed loop by a plurality of conduits, tubes, hoses or lines. For example, a first conduit 272 connects the compressor 264 and the condenser 266 in fluid communication, a second conduit 274 connects the condenser 266 to a valve 282, a third conduit 276 connects the valve 282 and the evaporator 68 in fluid communication, and a fourth conduit 278 connects the evaporator 268 and the compressor 264 in fluid communication. A first bypass conduit 280 is connected between the valve 282 and conduit 278. The valve 282 may be a solenoid valve that can be opened and closed to supply refrigerant to either conduit 276 or conduit 280 depending upon the operating mode of the heat-pump subsystem 252. For example, refrigerant is circulated into conduit 276 and not into conduit 280 when the air conditioning is ON. The valve 282 may be in communication with a controller 128. An optional heat exchanger 271 may be included to exchange heat between conduit 278 and conduit 276.

A first expansion device 284 may be disposed on conduit 272 and a second expansion device 286 may be disposed on conduit 276. The expansion devices are configured to change the pressure and temperature of the refrigerant in the heat pump subsystem 252. The expansion devices may include an electronic actuator controlled by the controller 128. The controller 128 may instruct the actuator to position the expansion device in a wide open position, a fully closed position, or a throttled position. The throttled position is a partially open position where the controller modulates the valve opening to modulate flow through the expansion device. The controller 128 and expansion devices may be configured to continuously or periodically modulate the throttled position in response to system operating conditions. By changing the opening within the expansion device, the controller can control flow, pressure, temperature, and state of the refrigerant as needed.

The heat pump subsystem 252 also includes a battery loop 288 having a chiller 290 and a third expansion device 292. The battery loop 288 may include a supply conduit 294 connected to conduit 276 at fitting 296 and connected to the chiller 290. The expansion device 292 may be on the supply conduit 294. Expansion device 292 may be similar to expansion devices 284 and 286. A return conduit 298 connects the battery chiller 290 and conduit 278 in fluid communication. The return conduit 298 may connect with conduit 278 via fitting 204.

The cabin loop 254 includes a heater core 210, a heater 212, a pump 214, a first valve 216, a sensor 218, and conduit forming a closed loop for circulating coolant, such as an ethylene glycol mixture. The heater 212 may be an electric heater powered by the battery 114. Coolant circulates from the pump 214 to the heater 212 via conduit 220. The heater 212 is connected to the heater core 210 via conduit 222. The heater core 210 is connected to pump 214 via conduit 224. The first valve 216 and the sensor 218 may be disposed on conduit 222. Alternately, conduit 222 may comprise separate conduits with one conduit connecting the heater 212 and the first valve 216, and another conduit connecting the first valve 216 and the heater core 210. The valve 216 may be a solenoid valve that is electronically controlled by the controller 128.

The cabin loop 254 may extract heat from the heat pump subsystem 252 via an intermediary heat exchanger 226 to provide heating to the cabin. Depending upon operating conditions, the cabin loop 254 can provide heat to the heater core 210 with thermal energy from the heat pump 252, the heater 212, or a combination of both. The intermediary heat exchanger 226 may be a refrigerant-to-coolant heat exchanger. The intermediary heat exchanger 226 facilitates the transfer of thermal energy between the cabin loop 254 and the heat pump subsystem 252. The intermediary heat exchanger 226 may be part of the cabin loop 254, the heat pump 252, or both. The heat exchanger 226 may have any suitable configuration. For example, the heat exchanger 226 may have a plate-fin, tube-fin, or tube-and-shell configuration that facilitates the transfer of thermal energy without mixing the heat transfer or coolant fluids. The heat exchanger 226 may be connected to conduit 272 of the heat pump 252 and to conduit 220 of the cabin loop 254.

The cabin loop 254 is configured to circulate heated coolant to the heater core 210 during at least a heating mode of the climate control system 250. The heater core 210 is disposed within the HVAC housing 258. The electric heater 212 is electrically connected to the traction battery 114, which provides power to the electric heater 212. The electric heater 212 may include a resistance heating element that converts electrical energy into thermal energy to heat the coolant circulating through the heater 212. The fan 260 disposed within the HVAC housing 258 circulates air across the heater core 210 to extract heat from the coolant, and blows the heated air into the passenger cabin to heat the cabin. The sensor 218 measures the temperature of the coolant circulating in conduit 222 and sends a signal to the controller 128 that is indicative of the coolant temperature. Based on this temperature signal, the controller may generate a heating request to increase heating output of the heater 212, the heat pump 252, or both depending upon a default heating source preference, a previously stored heating source user preference, and current ambient and vehicle operating conditions as described herein.

The battery thermal management system 262 may operate in a plurality of different modes, such as battery heating mode or battery cooling mode. The battery thermal management system 262 includes a battery coolant loop 230 that manages the temperature of the traction battery 114. The battery loop 230 includes a battery radiator 232, a chiller 290, a pump 236, a second valve 238, a sensor 240, a third valve 242, and conduit arranged to circulate a coolant-such as an ethylene glycol mixture-between the various components of the battery loop 230. For example, the pump 236 circulates coolant to the battery pack 114 via conduit 246. The sensor 240 may be disposed on conduit 246 upstream of the battery pack 114. The sensor 240 senses the temperature of the coolant and sends a signal indicative of the coolant temperature to the controller 128. Alternatively, the sensor may be omitted, and the coolant temperature is inferred. Coolant exiting the battery pack 114 circulates to a four-way connector 244, and either circulates to the battery radiator 232 or to the chiller 290 depending upon the positioning of the valves 216, 238, 242. The battery loop 230 may cool the traction battery 114 via either the battery radiator 232 or the chiller 290. The chiller 290 dissipates heat by transferring thermal energy from coolant within the battery loop 230 to the heat pump 252. The battery radiator 232 is disposed behind a front grille of the vehicle and dissipates heat to the outside air. An inlet port of the battery radiator 232 is connected to the four-way connector 244 via conduit 248. An outlet port of the battery radiator 232 is connected to an inlet of the valve 242 via conduit 250. An outlet of the valve 242 is connected back to the pump 236 via conduit 246. Another inlet of the valve 242 is connected to an outlet port of the chiller 290 via conduit 213. The valve 238 may be similar to the valve 216. The inlet port of the chiller 290 is connected to the valve 238 via conduit 206. The valve 238 may be similar to the valve 216. The valve 238 is connected to the four-way connector 244 via conduit 208. The valve 238 may be connected to conduit 222 of the cabin loop 254 via a first interconnecting conduit 211. The four-way connector 244 may be connected to the first valve 216 of the cabin loop 254 via a second interconnecting conduit 202.

The range of an electric vehicle is at least partially dependent upon the amount of stored energy in the battery pack. Vehicle range may be extended by using more battery energy for vehicle propulsion and less battery energy for ancillary operations, such as heating the battery or cabin. One way to increase vehicle range is to precondition one or more systems of the vehicle prior to departure. During preconditioning, the vehicle is electrically connected with an external power source 126 with key off and wall power available. As used herein, external power or wall power refers to any external electrical power source 126, such as the power grid or local solar power. During preconditioning, the wall power may be used to energize the vehicle systems instead of the battery to preserve battery power for vehicle propulsion. The vehicle may be preconditioned by heating the battery, the cabin, or both via the external power source 126 prior to departure depending on the stored heating source preference. The controller 128 may receive input from a user via HMI 130 scheduling the next departure time (or time to next planed usage) or may estimate a departure time based on customer habits. Based on this departure time, the controller 128 will begin preconditioning one or more of the vehicle systems at an appropriate time prior to departure and operate the electric heater 212 and/or heat pump 252 based on a previously stored heating source preference, which may be a default heating source or a user selecting heating source (based on a user selected driving mode or user selected preference for quiet or most efficient operation, for example). The duration of preconditioning varies according to the systems being preconditioned and the ambient conditions. For example, the battery typically requires a longer duration of preconditioning than the passenger cabin. As such, the controller may request heating of the battery prior to the cabin with heating provided by the electric heater 212 or heat pump 252 based on a previously stored preference, or based on being connected to external power source 126 with battery SOC and/or charging power being above corresponding thresholds.

Figure 3:
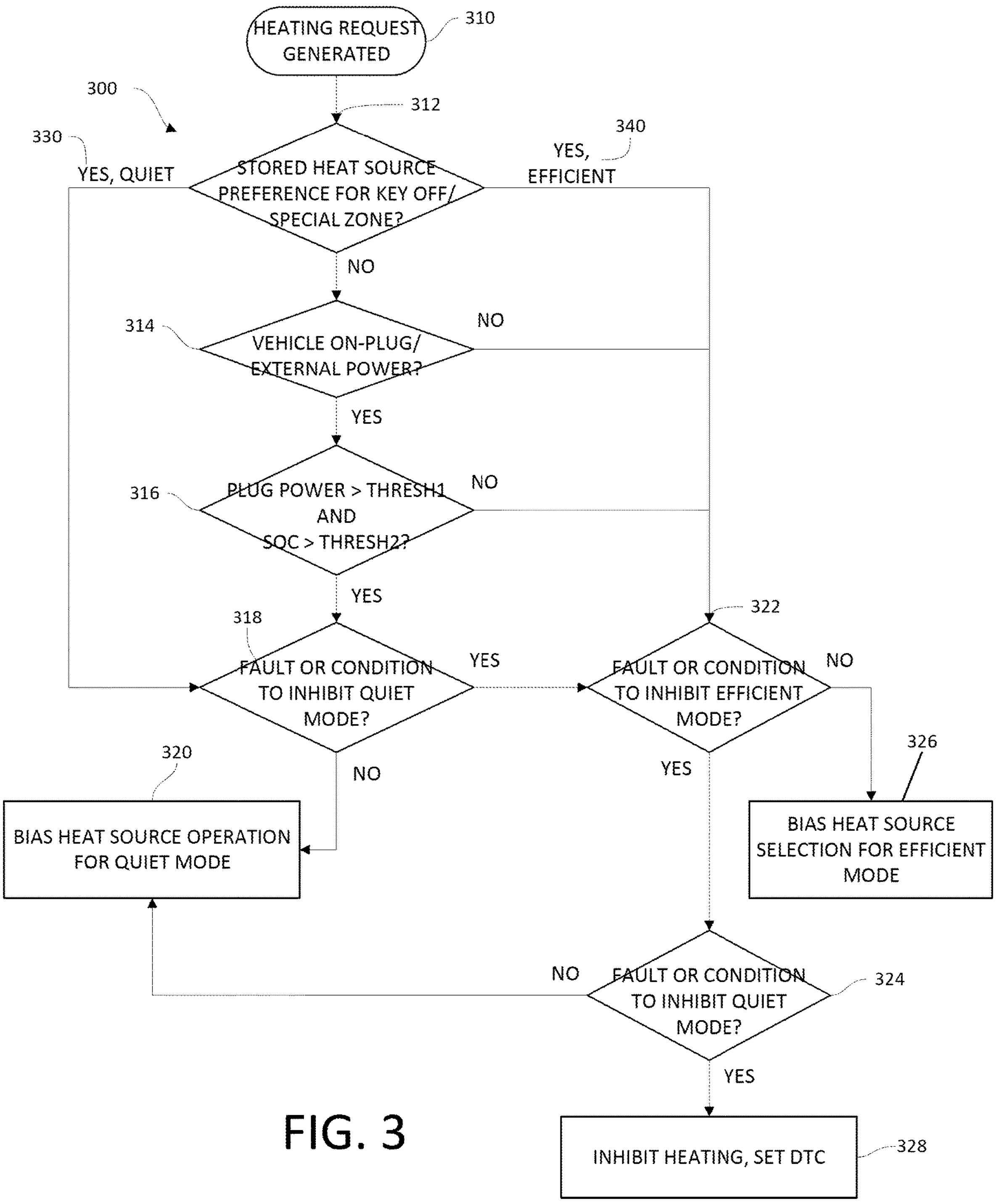
FIG. 3 is a simplified flow chart illustrating operation of a system or method for controlling an electric heater and heat pump to provide heat in response to a heating request based on a heating source preference or bias.

FIG. 3 is a flowchart illustrating operation of a system or method for controlling an electrified vehicle based on a stored heating source preference. The controller 128 (FIGS. 1-2) may cooperate with one or more other controllers to perform one or more control functions described herein. Control logic, functions, code, software, strategy etc. performed by one or more processors or controllers such as controller 128 may be represented by the block diagrams or flow charts shown in the various figures. The flow chart or block diagram 300 of FIG. 3 illustrates a representative control strategy, algorithm, and/or logic for operation of a system or method including two or more heating sources, such as an electric heater and a heat pump and may be implemented using one or more processing strategies such as event-driven, interrupt-driven, multi-tasking, multi-threading, and the like. As such, various steps or functions illustrated or described may be performed in the sequence as illustrated or described, in parallel, or in some cases omitted. Although not always explicitly illustrated or described, one of ordinary skill in the art will recognize that one or more of the steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, powertrain, or other controller or control module. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer or controller to control selection and operation of heating sources based on a stored preference or bias in addition to various current operating conditions.

The control strategy starts at block 310 and determines whether there is a stored heating source preference for key off or special zone operation at 312. The stored preference may be a default preference based on the model or trim level of the vehicle as previously described, or may be selected by a user via a vehicle HMI or another HMI in communication with the vehicle, such as a smart phone, for example. Selection by a user may include a direct mode selection associated with the thermal management system, such as selecting a quiet mode as indicated at 330 or a maximum efficiency mode at 340. Alternatively, or in combination, the stored preference may be inferred based on another user selection, such as a driving mode for ECO or Sport, for example. Special zone operation may be operation within a predetermined ambient temperature range, within a geofenced area (such as a residential neighborhood, a designated quiet zone, or within a garage, for example) operation below a vehicle speed threshold, etc. depending on the particular application and implementation.

In the absence of a stored user preference or bias for selection of a heating source as determined at 312, block 314 determines whether the vehicle is on-plug, i.e. connected to an external power source. If yes, block 316 determines whether the available external power exceeds a corresponding power threshold or charging rate, and whether the battery state of charge (SOC) exceeds a corresponding SOC threshold. The available power threshold may be based on an estimated charge completion time for a planned usage of the vehicle and the current battery SOC. If yes at 316, then block 318 determines whether a fault or other condition is present that inhibits operating in Quiet Mode. If no, then block 320 biases the heating system to operate in Quiet Mode to satisfy any heating request, such as a preconditioning request, for example. As previously described, Quiet Mode operation may use the electric heater to satisfy a heating request before operating the heat pump, although the controller may determine that operating conditions require operation of the heat pump in combination with the electric heater or even without the electric heater. If block 318 indicates that a fault or other condition that inhibits operation in Quiet Mode is present, then block 322 determines whether a fault or other condition that inhibits operation in Efficient Mode is present. If no at 322, then the heating system is biased for operation in Efficient Mode at 326. Otherwise, block 324 again determines whether a fault or other condition is present that inhibits operation in Quiet Mode, and if so, then block 328 sets a diagnostic code (DTC) and heating is inhibited. If no at 324, then the heating system is biased to operate in Quiet Mode at 320.

As also illustrated in FIG. 3, if block 312 determines that a heating source user preference has been selected or stored corresponding to Quiet Mode operation as represented at 330, then block 318 determines whether a fault or other condition is present that inhibits operating in Quiet Mode. If no, then block 320 biases the heating system to operate in Quiet Mode in response to a heating request, such as a battery heating request or cabin heating request during key-on operation, for example.

If block 312 determines that a heating source user preference has been selected or stored corresponding to Efficient Mode operation as represented at 340, then block 322 determines whether a fault or other condition is present that inhibits operation in the Efficient Mode. If no at 322, then the heating system is biased for operation in Efficient Mode at 326. Otherwise, block 324 determines whether a fault or other condition is present that inhibits operation in Quiet Mode, and if so, then block 328 sets a diagnostic code (DTC) and heating is inhibited. If no at 324, then the heating system is biased to operate in Quiet Mode at 320.

While representative examples are described above, it is not intended that these examples describe all possible forms or implementations of the claimed subject matter. The words used in the specification are words of description rather than limitation, and it is understood that various changes may be made without departing from scope of the claims. Additionally, the features of various implementing examples may be combined with one or more features from other examples to form further examples or embodiments of the claimed subject matter whether or not the particular combination of features is explicitly illustrated or described in detail. Although one or more examples or features may have been described as providing advantages over other examples or prior art implementations with respect to one or more desired characteristics, those of ordinary skill in the art recognize that one or more features or characteristics can be compromised to achieve desired overall system attributes, which depend on the specific application and implementation. As such, examples described as less desirable than others or prior art implementations with respect to one or more characteristics are not outside the scope of the disclosure and may be desirable for particular applications.

What is claimed is:

1. An electrified vehicle comprising:

an electric machine arranged to selectively provide propulsive torque to wheels of the electrified vehicle;

a battery electrically coupled to the electric machine;

a heater powered by the battery and configured to heat a cooling fluid;

a cooling circuit arranged to circulate the cooling fluid through the electric machine, the battery, the heater, and a heat exchanger;

a heat pump in fluid communication with the heat exchanger; and a controller having an associated memory containing a stored heating source preference, the stored heating source preference being changeable from a heating source default preference to a heating source user preference, the controller programmed to, responsive to receiving a heating request while the stored heating source preference is the heating source default preference:

when the electrified vehicle is electrically connected to an external power source to receive external electric power and state of charge of the battery is above an associated state of charge threshold, operate the heater and not the heat pump to heat the cooling fluid; and operate the heat pump and not the heater to heat the cooling fluid when either the electrified vehicle is not electrically connected to the external power source to receive external electric power, or when the battery is not above the associated state of charge threshold.

2. The electrified vehicle of claim 1 wherein the controller is further programmed to, responsive to the heating request and the stored heating source preference being a heating source user preference corresponding to quiet operation that biases operation toward the heater relative to the heat pump to reduce noise, vibration, and harshness:

operate the heater and not the heat pump to heat the cooling fluid when the state of charge of the battery is above a corresponding threshold; and operate the heat pump and not the heater to heat the cooling fluid when the state of charge of the battery is not above the corresponding threshold.

3. The electrified vehicle of claim 1 wherein the controller is further programmed to operate the heat pump to heat the cooling fluid in response to the available external electric power being less than an associated power threshold irrespective of the battery being above the associated state of charge threshold.

4. The electrified vehicle of claim 1 wherein the controller is further programmed to, responsive to the heating request and the stored heating source preference being a heating source user preference corresponding to efficient operation that biases operation toward the heat pump relative to the heater to improve heating efficiency, operate the heat pump and not the heater to heat the cooling fluid.

5. The electrified vehicle of claim 1 wherein the controller is further programmed to, responsive to the heating request, the stored heating source preference, and operating conditions of the electrified vehicle being within a predetermined special zone of operation, operate the heater and not the heat pump to heat the cooling fluid.

6. The electrified vehicle of claim 5 wherein the predetermined special zone of operation corresponds to operation within a geofenced region.

7. The electrified vehicle of claim 5 wherein the predetermined special zone of operation corresponds to operation below a predetermined vehicle speed.

8. The electrified vehicle of claim 1 further comprising a human-machine interface, wherein the controller is further programmed to store a heating source user preference received via the human-machine interface in the associated memory.

9. The electrified vehicle of claim 8 wherein the controller is further programmed to bias operation of the heater and the heat pump in response to the heating request, the stored heating source user preference, and current operating conditions of the electrified vehicle.

10. A method for controlling an electrified vehicle having a human-machine interface configured to store a heating source user preference, a battery powering an electric machine to provide torque to vehicle wheels, an electric heater powered by the battery, and a heat pump, the method comprising, by a vehicle controller:

determining whether a heating source user preference has been stored in an associated memory location accessible by the vehicle controller; and responsive to receiving a heating request when a heating source user preference has not been stored in the associated memory location accessible by the vehicle controller, operating the heater and not the heat pump to heat a cooling fluid when the electrified vehicle is electrically connected to an external power source to receive external power and state of charge of the battery is above an associated state of charge threshold, and operating the heat pump and not the heater to heat the cooling fluid when the electrified vehicle is not electrically connected to the external power source to receive external power or when state of charge of the battery is not above the associated state of charge threshold.

11. The method of claim 10 further comprising receiving a user preference associated with a preferred heating source via the human machine interface, storing the user preference associated with a preferred heating source in the associated memory location, and selecting at least one of the heater and the heat pump for operation to provide heat in response to the heating request based on the user preference associated with the preferred heating source.

12. The method of claim 11 further comprising selecting at least one of the heater and the heat pump for operation based on operation of the electrified vehicle being within a predetermined special zone of operation.

13. The method of claim 12 wherein the predetermined special zone of operation comprises an ambient temperature range.

14. The method of claim 12 wherein the predetermined special zone of operation comprises a geographical region designated as a quiet zone.

15. A system for an electrified vehicle, the system comprising:

a cooling circuit including at least an electric heater and a heat pump configured to generate heat to a coolant circulating within the cooling circuit; and a controller programmed to, responsive to receiving a heating request, operate at least one of the electric heater and the heat pump based on a previously stored preference indicating either quiet operation of the system that biases operation toward the electric heater relative to the heat pump to reduce noise, vibration, and harshness of the electrified vehicle or efficient operation of the system that biases operation toward the heat pump relative to the electric heater to improve heating efficiency of the electrified vehicle.

16. The system of claim 15 wherein the controller is further programmed to operate the electric heater before operating the heat pump responsive to the previously stored preference indicating the quiet operation of the system.

17. The system of claim 15 wherein the controller is further programmed to operate the heat pump before operating the electric heater responsive to the previously stored preference indicating the efficient operation of the system.

18. The system of claim 15 wherein the controller is further programmed to operate the electric heater before operating the heat pump in response to the system being within a predetermined special zone of operation regardless of the previously stored preference.

19. The system of claim 18 wherein the predetermined special zone of operation comprises a designated geographical quiet zone.

* * * * *